United States Patent
Brito et al.

(10) Patent No.: US 11,218,369 B2
(45) Date of Patent: *Jan. 4, 2022

(54) METHOD, APPARATUS AND SYSTEM FOR CHANGING A NETWORK BASED ON RECEIVED NETWORK INFORMATION

(71) Applicant: NOKIA SOLUTIONS AND NETWORKS OY, Espoo (FI)

(72) Inventors: Rodrigo Antonio Mendes De Brito, Lisbon (PT); Somasundaram Velayutham, Sunnyvale, CA (US); Marc Rouanne, Jouy en Josas (FR); Martin Holecek, Prague (CZ)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/940,276

(22) Filed: Jul. 27, 2020

(65) Prior Publication Data

US 2020/0358653 A1 Nov. 12, 2020

Related U.S. Application Data

(63) Continuation of application No. 15/517,277, filed as application No. PCT/EP2014/071369 on Oct. 7, 2014, now Pat. No. 10,833,931.

(51) Int. Cl.
*H04L 12/24* (2006.01)
*H04W 24/02* (2009.01)
(Continued)

(52) U.S. Cl.
CPC .......... *H04L 41/0816* (2013.01); *H04L 41/22* (2013.01); *H04W 24/02* (2013.01); *H04W 84/042* (2013.01); *H04W 84/12* (2013.01)

(58) Field of Classification Search
CPC .... H04L 41/0816; H04L 41/22; H04W 24/02; H04W 84/042; H04W 84/12
See application file for complete search history.

(56) References Cited

U.S. PATENT DOCUMENTS

| | | | |
|---|---|---|---|
| 5,699,403 | A | 12/1997 | Ronnen |
| 6,577,597 | B1 | 6/2003 | Shankar et al. |

(Continued)

FOREIGN PATENT DOCUMENTS

| | | |
|---|---|---|
| CN | 101964985 A | 2/2011 |
| CN | 102077636 A | 5/2011 |

(Continued)

OTHER PUBLICATIONS

Second Office Action dated Jun. 3, 2020 corresponding to Chinese Appln. No. 201480083911.3. No copy provided, per MPEP 609. Copy submitted in parent U.S. Appl. No. 15/517,277.

(Continued)

*Primary Examiner* — Sm A Rahman
(74) *Attorney, Agent, or Firm* — Squire Patton Boggs (US) LLP (57) ABSTRACT

There is provided a method, said method comprising receiving network information, using said network information to determine whether a change to a network is required, and if so, using said network information to determine at least one cause of a change to the network being required and providing, in dependence of the at least one cause, at least one option for at least one change to said network.

20 Claims, 8 Drawing Sheets

(51) Int. Cl.
    *H04W 84/04* (2009.01)
    *H04W 84/12* (2009.01)

(56) References Cited

U.S. PATENT DOCUMENTS

| | | | |
|---|---|---|---|
| 2004/0143428 A1 | 7/2004 | Rappaport et al. | |
| 2005/0114493 A1* | 5/2005 | Mandato | H04L 67/306 709/223 |
| 2005/0251339 A1* | 11/2005 | Araki | G05B 23/0229 702/2 |
| 2007/0226807 A1 | 9/2007 | Ginter et al. | |
| 2010/0022263 A1 | 1/2010 | Stamoulis | |
| 2010/0138688 A1* | 6/2010 | Sykes | H04L 41/147 714/4.1 |
| 2011/0105139 A1 | 5/2011 | On | |
| 2014/0075567 A1 | 3/2014 | Raleigh et al. | |
| 2015/0057005 A1 | 2/2015 | Sun et al. | |
| 2015/0309813 A1* | 10/2015 | Patel | G06F 11/3664 703/22 |

FOREIGN PATENT DOCUMENTS

| | | | |
|---|---|---|---|
| CN | 102106168 | A | 6/2011 |
| CN | 102547804 | A | 7/2012 |
| CN | 102801556 | A | 11/2012 |
| CN | 103067900 | A | 4/2013 |
| CN | 103384372 | A | 11/2013 |
| DE | 10 2007 006184 | B3 | 6/2008 |
| KR | 20110036763 | A | 4/2011 |
| WO | 2011005524 | A9 | 1/2011 |

OTHER PUBLICATIONS

First Office Action issued in corresponding Chinese Appln. No. 201480083911.3, dated Jul. 29, 2019. No copy provided, per MPEP 609. Copy submitted in parent U.S. Appl. No. 15/517,277.

Korean Office Action, Notice to File a Response Appln. No. KR20177012292 20141007, dated Nov. 22, 2017. No copy provided, per MPEP 609. Copy submitted in parent U.S. Appl. No. 15/517,277.

International Search Report and Written Opinion dated Jun. 3, 2015 corresponding to International Patent Appln. No. PCT/EP2014/071369. No copy provided, per MPEP 609. Copy submitted in parent U.S. Appl. No. 15/517,277.

3GPP TS 32.522 V11.7.0 (Sep. 2013), Technical Specification, 3rd Generation Partnership Project; Technical Specification Group Services and system Aspects; Telecommunication management; Self-Organizing Network (SON) Policy Network Resource Model (NRM) Intergration Reference Point (IRP), Information Service (IS) (Release 11), Sep. 19, 2013, XP050906126. No copy provided, per MPEP 609. Copy submitted in parent U.S. Appl. No. 15/517,277.

Lars Christoph Schmelz et al: "A coordination Framework for Self-Organisation in LTE Networks," May 23, 2011, Integrated Network Management (IM), 2011 IFIP/IEEE International Symposium on, IEEE, pp. 193-200, XP032035479. No copy provided, per MPEP 609. Copy submitted in parent U.S. Appl. No. 15/517,277.

Chinese Office Action correspond to CN Appln. No. 201480083911.3, dated Dec. 3, 2020.

* cited by examiner

METHOD, APPARATUS AND SYSTEM FOR CHANGING A NETWORK BASED ON RECEIVED NETWORK INFORMATION

CROSS REFERENCE TO RELATED APPLICATION

This application is a Continuation of co-pending U.S. patent application Ser. No. 15/517,277, filed on Apr. 6, 2017, which is the National Stage of PCT International Application No. PCT/EP2014/071369, filed on Oct. 7, 2014. The entire content of the above-referenced applications is hereby incorporated by reference.

TECHNICAL FIELD

The present application relates to a method, apparatus and system and in particular but not exclusively, coordinating traffic between two networks, such as a cellular communication network and a wireless local area network.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the $3^{rd}$ Generation Partnership Project (3GPP). The various development stages of the 3GPP LTE specifications are referred to as releases.

SUMMARY

In a first aspect there is provided a method comprising receiving network information, using said network information to determine whether a change to a network is required, and if so, using said network information to determine at least one cause of a change to the network being required and providing, in dependence of the at least one cause, at least one option for at least one change to said network.

Network information may comprise at least one of network performance information, predicted network performance information and network environment information.

The method may comprise determining if a trigger event is occurring in dependence on network environment information.

The method may comprise disregarding network information associated with said trigger event when determining whether to change said network.

The method may comprise displaying said at least one option.

The method may comprise causing said at least one change to said network.

The method may comprise determining potential cost of said option in dependence on network information.

The method may comprise determining weighting factors in dependence on said potential cost.

The method may comprise applying said weighting factors to a plurality of options.

Said network information may comprise at least one of network quality information, network capacity information, network load information, network topology information, and customer usage information.

The at least one option may comprise at least one of hardware and software adjustment.

In a second apparatus there is provided an apparatus, said apparatus comprising means for receiving network information, means for using said network information to determine whether a change to a network is required, and means for, if so, using said network information to determine at least one cause of a change to the network being required and means for providing, in dependence of the at least one cause, at least one option for at least one change to said network.

Network information may comprise at least one of network performance information, predicted network performance information and network environment information.

The apparatus may comprise means for determining if a trigger event is occurring in dependence on network environment information.

The apparatus may comprise means for disregarding network information associated with said trigger event when determining whether to change said network.

The apparatus may comprise means for displaying said at least one option.

The apparatus may comprise means for causing said at least one change to said network.

The apparatus may comprise means for determining potential cost of said option in dependence on network information.

The apparatus may comprise means for determining weighting factors in dependence on said potential cost.

The apparatus may comprise means for applying said weighting factors to a plurality of options.

Said network information may comprise at least one of network quality information, network capacity information, network load information, network topology information, and customer usage information.

The at least one option may comprise at least one of hardware and software adjustment.

In a third aspect there is provided an apparatus, said apparatus comprising at least one processor, and at least one memory including computer program code, the at least one memory and the computer program code configured to, with the at least one processor, cause the apparatus at least to receive network information, use said network information to determine whether a change to a network configuration is required, and if so, use said network information to determine at least one cause of a change to the network configuration being required and provide, in dependence of the at least one cause, at least one option for at least one change to said network configuration.

Network information may comprise at least one of network performance information, predicted network performance information and network environment information.

The apparatus may be configured to determining if a trigger event is occurring in dependence on network environment information.

The apparatus may be configured to disregard network information associated with said trigger event when determining whether to change said network.

The apparatus may be configured to display said at least one option.

The apparatus may be configured to cause said at least one change to said network.

The apparatus may be configured to determine potential cost of said option in dependence on network information.

The apparatus may be configured to determine weighting factors in dependence on said potential cost.

The apparatus may be configured to apply said weighting factors to a plurality of options.

Said network information may comprise at least one of network quality information, network capacity information, network load information, network topology information, and customer usage information.

The at least one option may comprise at least one of hardware and software adjustment.

In a fourth aspect there is provided a computer program embodied on a non-transitory computer-readable storage medium, the computer program comprising program code for controlling a process to execute a process, the process comprising: receiving network information, using said network information to determine whether a change to a network is required, and if so, using said network information to determine at least one cause of a change to the network being required and providing, in dependence of the at least one cause, at least one option for at least one change to said network.

Network information may comprise at least one of network performance information, predicted network performance information and network environment information.

The process may comprise determining if a trigger event is occurring in dependence on network environment information.

The process may comprise disregarding network information associated with said trigger event when determining whether to change said network.

The process may comprise displaying said at least one option.

The process may comprise causing said at least one change to said network.

The process may comprise determining potential cost of said option in dependence on network information.

The process may comprise determining weighting factors in dependence on said potential cost.

The process may comprise applying said weighting factors to a plurality of options.

Said network information may comprise at least one of network quality information, network capacity information, network load information, network topology information, and customer usage information.

In a fifth aspect there is provided a computer program comprising computer executable instructions which when run on one or more processors perform the method of the first aspect.

In the above, many different embodiments have been described. It should be appreciated that further embodiments may be provided by the combination of any two or more of the embodiments described above.

BRIEF DESCRIPTION OF THE DRAWINGS

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
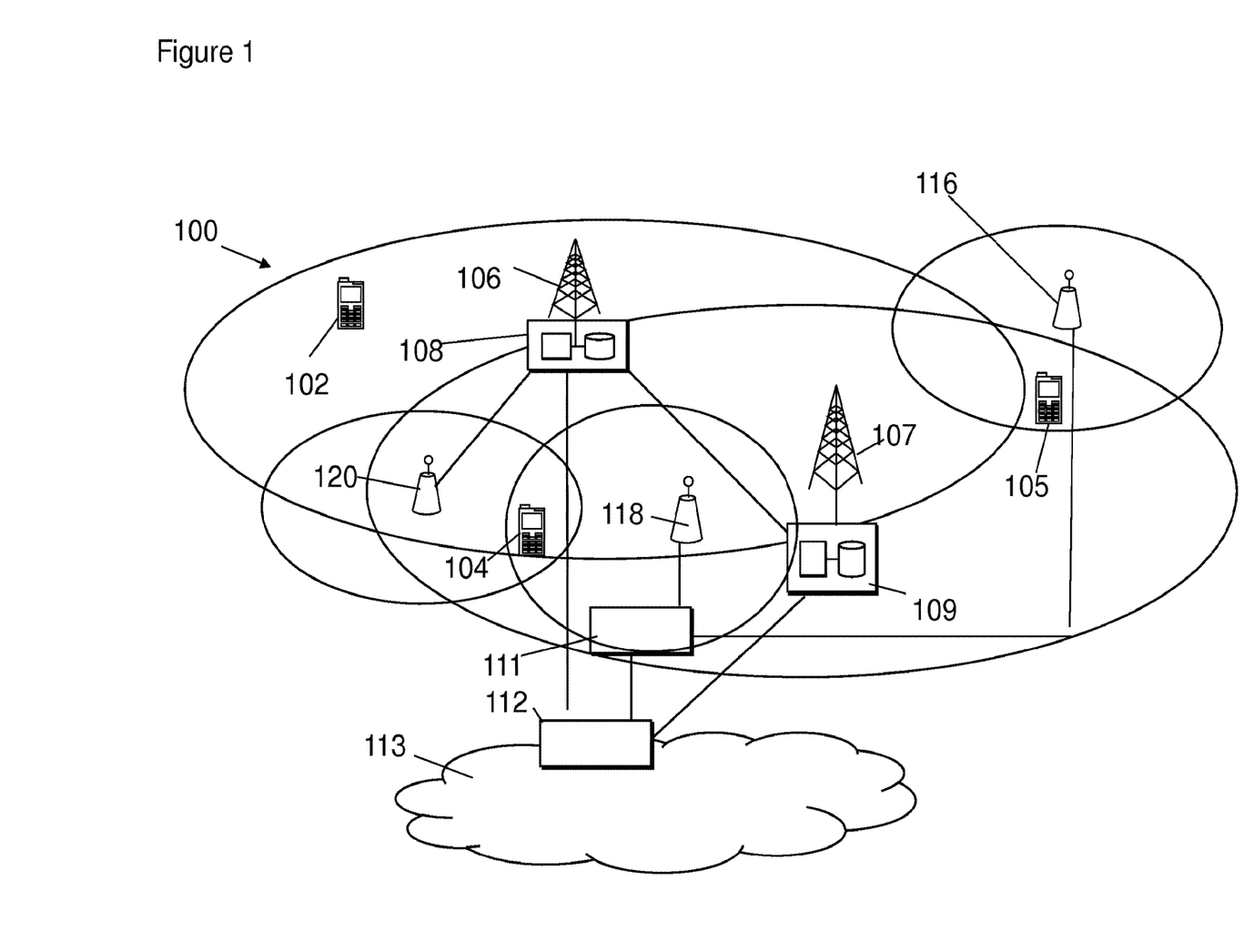
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller. The control apparatus may be as the apparatus shown in FIG. 6, described below.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
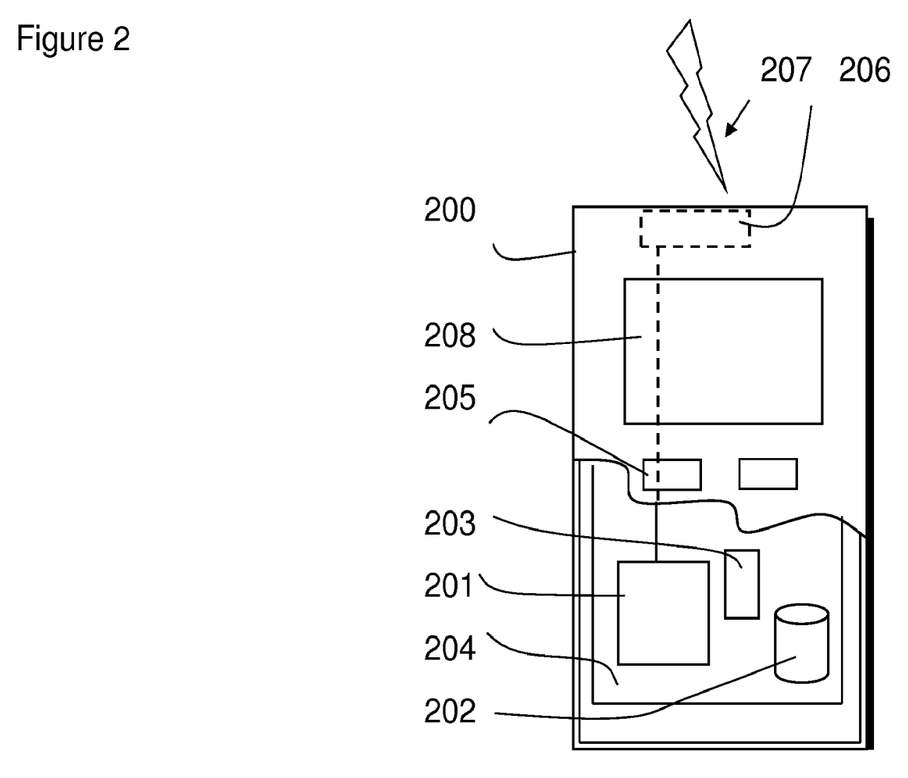
FIG. 2 shows a schematic diagram, of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). A base station can provide coverage for an entire cell or similar radio service area.

Figure 3:
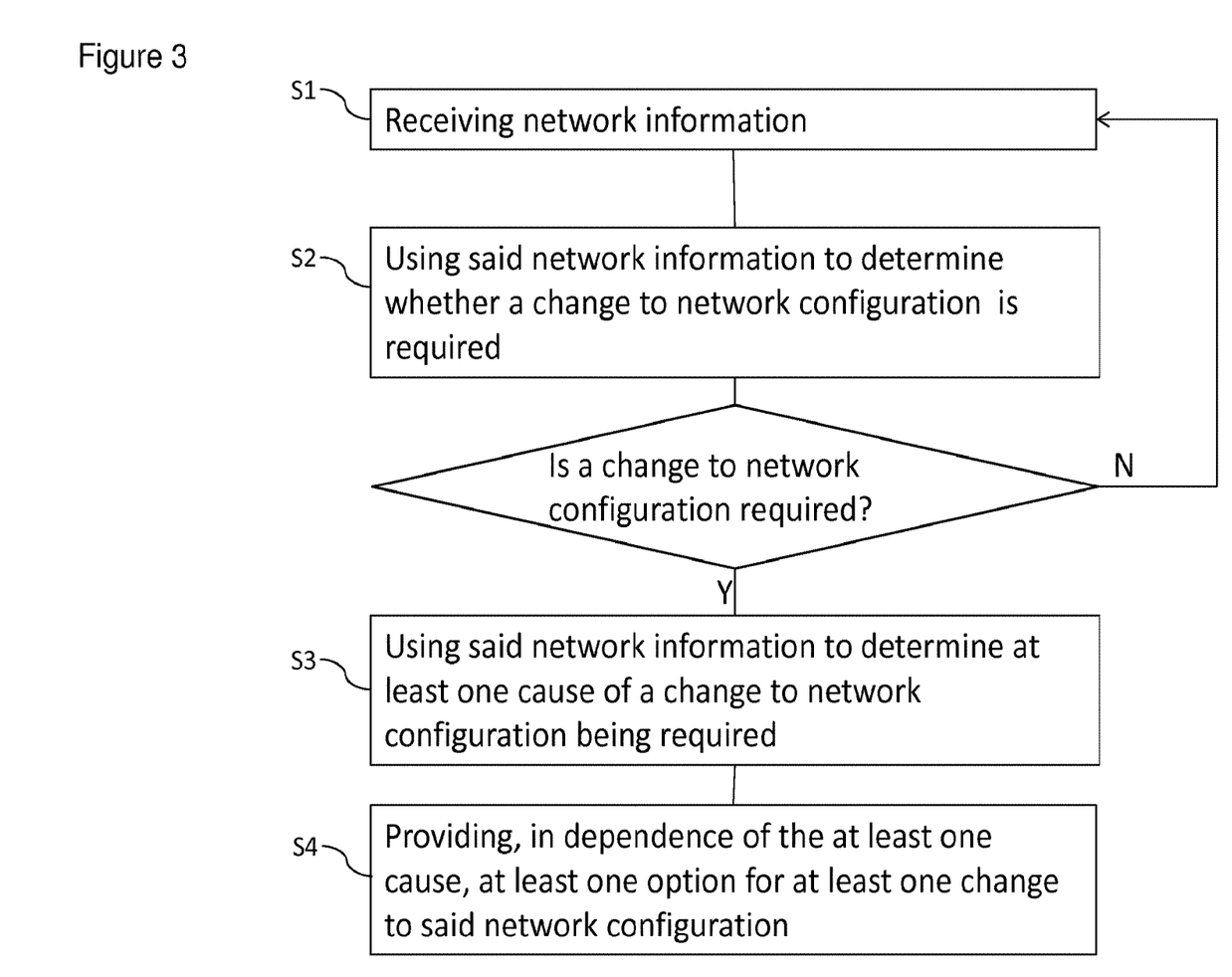
FIG. 3 shows a flow chart of an example recommender method

FIG. 3 shows a method, which may be implemented in a recommender apparatus, of providing network improvement recommendations to a user, for example, a network operator. In a first step S1, the method comprises receiving network information. In a second step S2, said network information may be used to determine whether a change to a network is required, and if so, said network information may be used, in a third step S3, to determine at least one cause of a change to the network being required. In a fourth step S4, the method may comprise providing, in dependence of the at least one cause, at least one option for at least one change to said network. The at least one option may be displayed to a user and/or operator. Alternatively or in addition, an option may be implemented automatically. An apparatus comprising a processor, a memory and a display may be provided to receive network information, perform a method as described above and display a network performance issue, i.e. that a change to a network is required, and/or adjustments to address the performance issue, i.e. an option for change to a network, to a user.

A change to a network may be a change to network arrangement or implementation. For example, the change may be a change to network topology (such as acquisitions of new network equipment and/or network element capacity extensions), setup (such as enabling network equipment features) and/or configuration (such as optimisations and changes to the network configuration). A change to a network may comprise adding and/or changing the existing properties of hardware (HW), software (SW) and/or firmware (FW). A change to an existing property may comprise, for example, antenna lowering tilting or reorientation.

Network information may comprise at least one of network performance information, predicted network performance information and network environment information. Network environment information may comprise information regarding environmental factors external to the network.

The recommender may be configured to perform a method comprising determining a network performance issue and determining whether the network is operating under usual conditions and if not, indicating the network performance issue to a user.

In dependence on network performance information, network environment information and network configuration information, at least one cause of the network performance issue may be determined. In dependence of the at least one cause, at least one adjustment to said network may be determined.

The recommender may be configured to perform a method comprising receiving network performance information, said information indicating that a change to a network is required, determining if a trigger event is occurring and disregarding network performance information associated with said trigger event when determining whether to change said network.

A method performed by the recommender may comprise determining if a trigger event is occurring in dependence on network information, for example network environment information, and disregarding network information associated with said trigger event when determining whether a change to said network is required and at least one option for said change. A trigger event may be an extraordinary occurrence in the network environment which affects network performance. Thus, if a network performance issue, or a change to a network being required, is caused by unusual external conditions, network performance issues, options for improving network performance and/or an option for a change to a network may be provided incorrectly or unnecessarily. Trigger events may be defined as events which may affect network performance temporarily and/or are outside the scope of network implementation. For example, a trigger event may result in an increase in the traffic or load of a network by introducing an increase in users to a geographical location for a short amount of time such as an unusual weather event and/or natural disaster. Since such events may affect network performance temporarily or unpredictably, changing a network when trigger events are occurring into account may be counterproductive to overall network performance.

Network information used by the recommender for a decision on the cause of a required change to a network may be the latest available information, so that the recommendations provided, e.g. that a change to a network is required or an option for a change to a network, may be valid.

Network information, for example, network performance information, may be obtained from a real time online analytics system. Information may relate to, amongst others, service quality such as KPI (key performance indicators) or KQI (key quality indicators) for a particular technology, QoE (quality of experience, net promoter score, customer experience index, churn output, network topology and information, cell load and/or capacity parameters. Anomalies may be reported with thresholds are violated or known patterns identified.

Network information may comprise information other than data reported from the network and may comprise, amongst others, actual and historical device distribution, actual and historical device capacity subscriber segmentation, segmentation based on binning parameters such as offpeak, onpeak, traffic growth based on geography (cell and technology independent), user behaviour and application usage and subjective feedback from subscribers. Predicted network performance information may be determined using a predictive analytics based on network information, including network performance information. The predicted network performance information may be used to identify or forecast anomalies.

Network environment information may use contextual information and may involve, for example, considering external factors. The network environment information may involve determining, based on external inputs for example, rich site summary (RSS) feeds with alerts from news agencies, a historical database which provides information regarding e.g. weather, or any other suitable external systems. Network environment information may be determined using context based analytics. The network environment information may be used to provide the network information used in determining whether a trigger event is occurring.

Several databases (sources of data, or network information, may be maintained). Some examples of databases (DB) are as follows:

a) a configuration DB: may be used to store the configuration of each network element including hardware, software and license capacity. The configuration DB may contain the physical aspects of a network element such as address, longitude, latitude and vendor type. For radio Network Elements (NE) the configuration DB may include the antenna data (for example the height, azimuth, type and/or tilt (both mechanical tilt (MT) and electrical tilt (ET))).

b) A geographical area DB: may be used to store geographical dimensions, such as polygon size, composition, location and its orientation. This Database may be updated with each new network element.

c) RSS feeds: this database may maintain data on events that may have impact to, for example, capacity and overload of network, such as force majeure (earthquakes, fire, tsunami, etc), but also social events such as election, public holiday, wedding, football match. Such data may comprise network environment information and may be used in determining whether a network is operating under usual conditions, i.e. whether a trigger event is occurring.

d) Customer defaults DB: may contain default data of customer such as frequency spectrum allocation, default/standard parameters for network layering and power control, agreed spectrum use for different technology (like 1800 for LTE and 2100 for 3G)

e) Device DB: contains the device capability and type aggregated based on time and location f) Revenue overflow: may contain information regarding the actual calls/data overflow and equivalent of monetary value in loss g) Alarms DB: may contain aggregated alarms with impact to capacity The data sources that can be used to provide create usable data, or network information to a recommender system may comprise, amongst others, customer experience management (CEM) clients on devices, e.g. software clients installed on a statistical representative sample of devices which may collect service quality and user perception information, probes, network elements, operations support systems (OSS), CEM systems, which may collect service quality and usage information from mobile network radio and core, device management which can be used to correlate subscriber information with the device type, creating more reliable recommendations, rich site summary (RSS) feeds which may be used to provide real time contextual information. RSS feeds may be used to provide network environment information and the data provided by the RSS feeds may be used in determining whether a network is operating under usual conditions, i.e. if a trigger event is occurring.

The method, and the apparatus that performs the method, in the case where there is a plurality of recommendations, or options for change, for an identified issue, may determine a cost of each recommendation. The cost of each recommendation may comprise Impact on "lost Revenue" or impact on "traffic overflow" (e.g. number of lost calls). This is available both for current time/situation and as well for future (based on forecasting), the effort and cost of implementation, the risk and/or probability to address the problem, scalability (how future proof the recommendation is). The apparatus may then determine weighting factors in dependence of the cost.

A ranking calculation may be based on weighting of these inputs, with the weights adjusted based on historical trends (which may be defined using predictive analytics or machine learning) or human inputs.

Each recommendation, or option for change to a network, may comprise an adjustment to address a network performance issue. Such a recommendation may comprise a software and/or hardware adjustment to the network. For example, the adjustment may comprise, introducing new equipment, feature or service, a capacity extension or other scope to the network. The recommender uses latest information that is required for decision on the root cause and recommendation, so that the recommendations are valid.

The method may provide several options for taking action on the recommendation, e.g. actions may be any one of sending the recommendation for review/approval by another team, planning the deployment of the recommendation for a later stage, requesting a quote from the supplier of network equipment to determine the cost of implementing that recommendation and issuing the purchase order of the necessary goods or services to the supplier.

A recommendations display may show all recommendations with appropriate status, to indicate whether the recommendations are new or already processed and being ordered.

Figure 4:
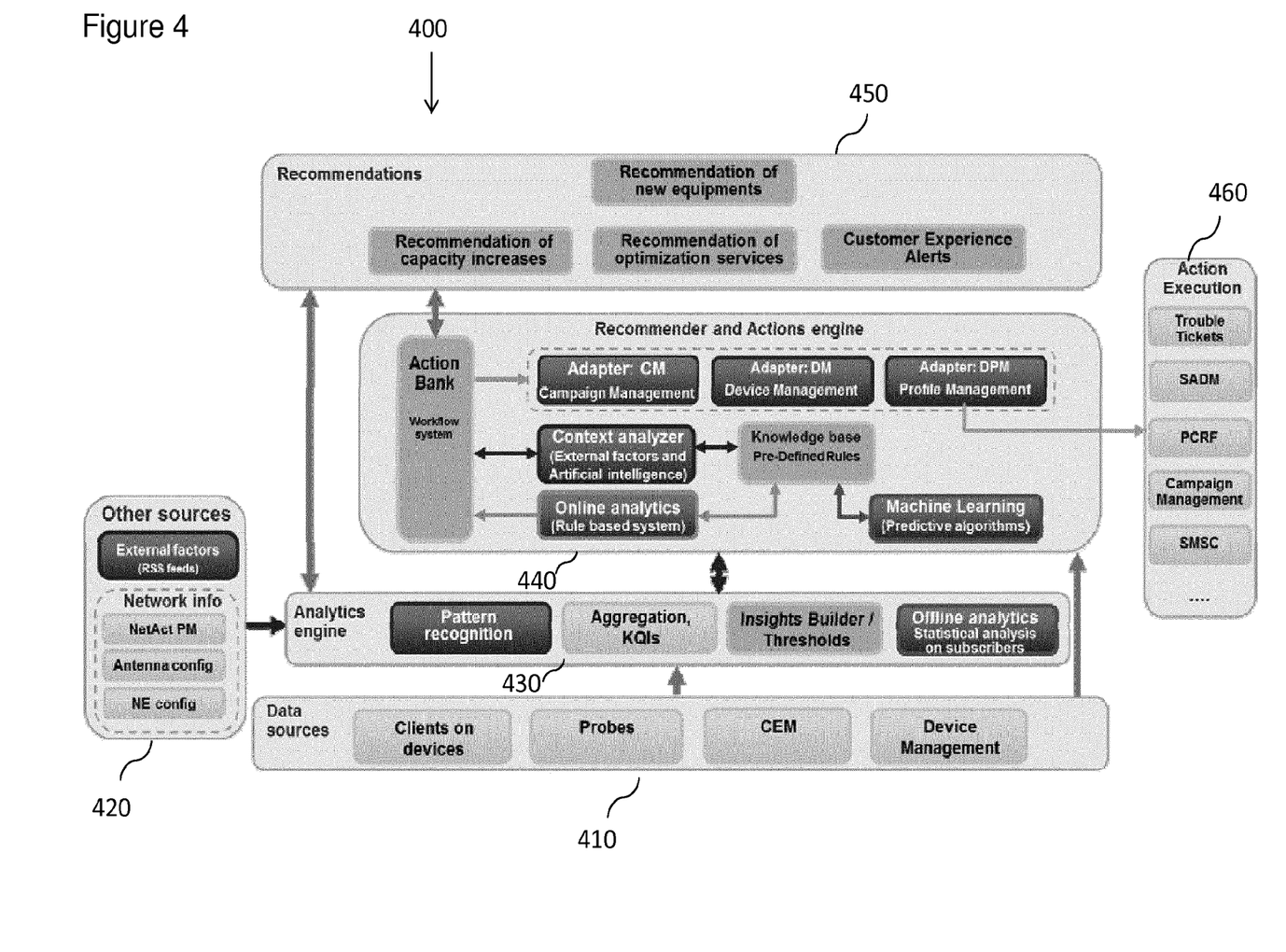
FIG. 4 shows a schematic diagram of an example recommender system.
Figure 5:
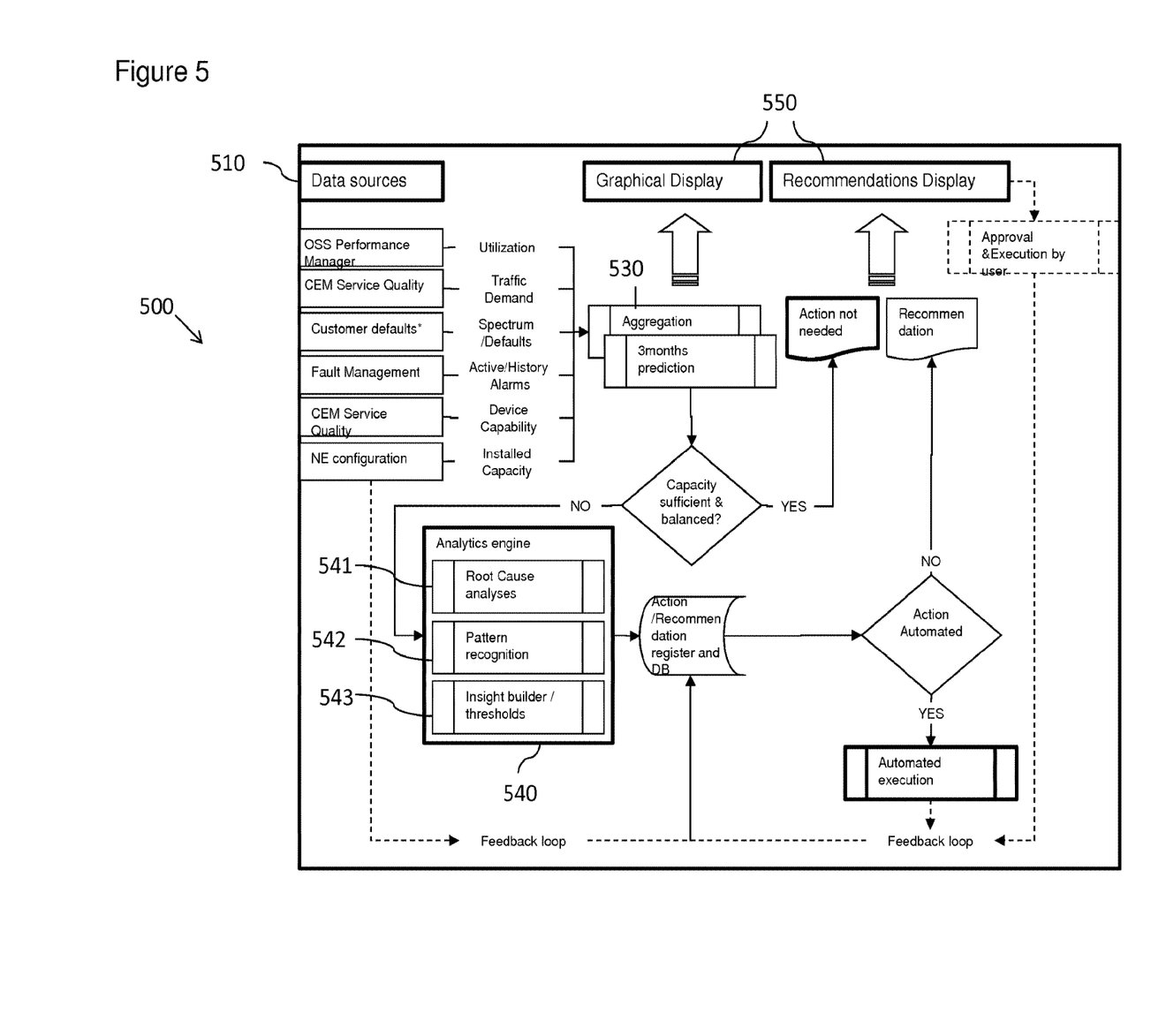
FIG. 5 shows a flow chart of an example recommender method.
Figure 6:
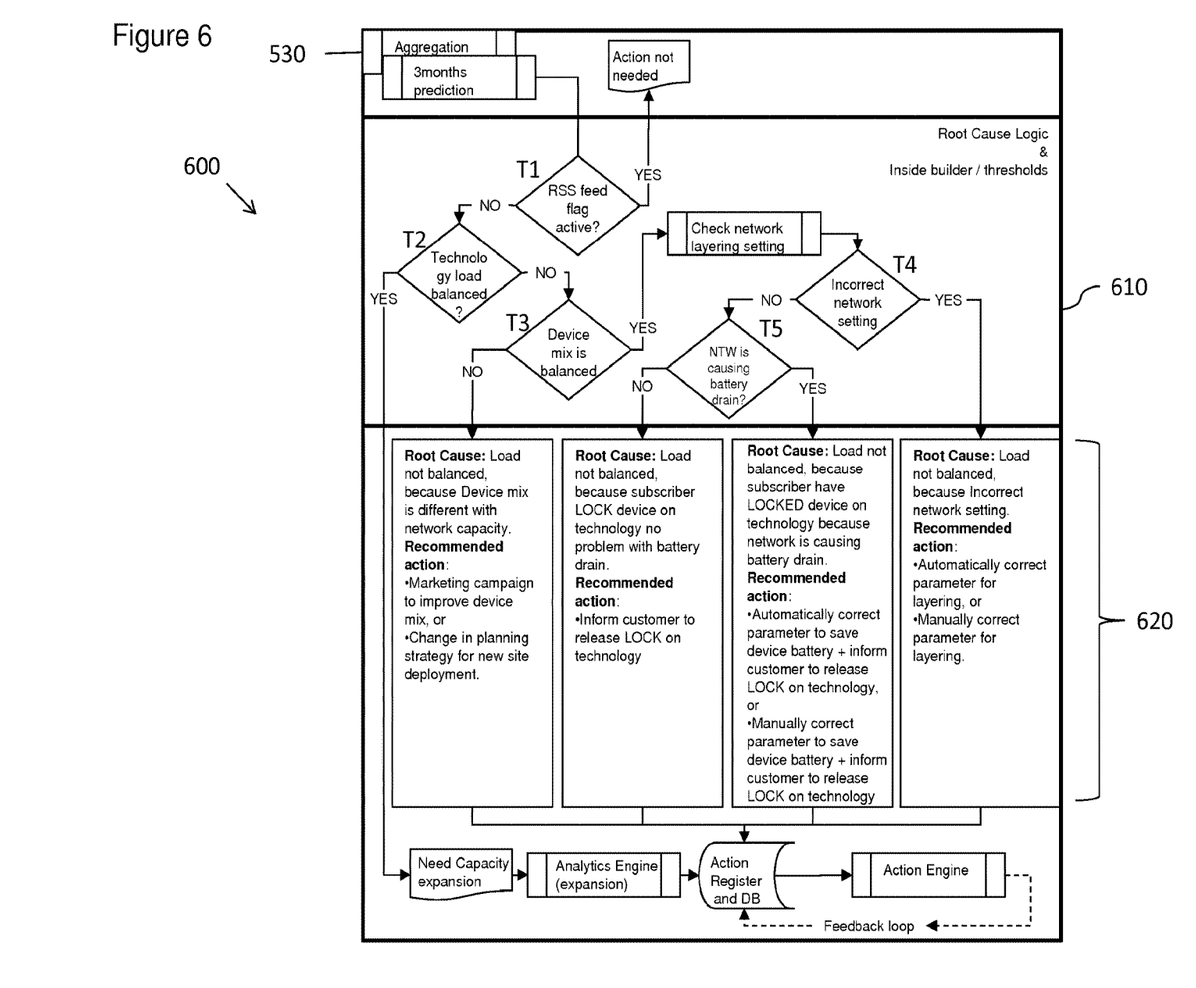
FIG. 6 shows a flow chart of an example recommender method.

FIG. 4 shows blocks of an apparatus, or recommender system 400, which may be used to implement the method of FIG. 3. FIGS. 5 and 6 show a detailed flowchart of one example of a recommender system performing the method of FIG. 3.

The example shown in FIGS. 4, 5 and 6 involves simply one example of a network performance issue which may occur in a network, be identified by the recommender system and for which the recommender system may recommend a solution. The set of recommendations and scenarios to which the recommender system may be applied are much wider than the example described below. Mobile operators may build overlaying technology (e.g. 2G, 3G, and 4G) networks that have overlapping cells of the same geographical area. In the case that one of the technologies becomes congested, there can be a loss of revenue due to traffic overflow. FIGS. 4, 5 and 6 show an example of the logic that a recommender system may use in this case, by way of example, to identify a network performance issue, or that a change to a network is required and to address the network performance issue, i.e. to provide at least one option for at least one change to said network to manage traffic sharing across different technologies.

In the system of FIG. 4, data sources 410 such as clients on devices, e.g. software on a user's phone, probes, CEM and device management, as well as other data sources 420, which may be used to provide network information. The data is provided to an analytics engine 430 and from there to a recommender and actions engine 440 or to recommendations block 450. The recommendations block may provide information to recommendations block 450 or action execution block 460.

FIG. 5 shows a flow chart of a recommender system 500, such as that of FIG. 4. The recommender 500 may aggregate data, or network information, from a number of data sources 510. In the example shown in FIG. 5, the recommender aggregates data from OSS Performance Manager, CEM Service Quality, Customer Defaults, Fault Management, CEM serve quality and network element configuration. Aggregator 530 may provide predictive network performance information, for example a three month traffic prediction, in dependence on the data.

If, in dependence on the network information, it is determined that network capacity is not sufficient and/or balanced, i.e. a network performance issue has been identified and a change to a network is required, an analytics engine 540, which will be described in more detail below, may determine the root cause of the capacity issue, using the network information. The analytics may also determine if the network is operating under normal conditions, i.e. if a trigger event is occurring. The analytics engine 540 may provide a recommendation. The recommendation may be provided to an operator on a graphical display 550 to take further action or may be executed automatically. The recommender may take RSS feeds, alarms, device capability and geographical properties of the cells into consideration when creating the recommendation. A graphical display 550 may highlight all required information. E.g. the information may be colour coded. Such highlighting may provide ease of use to an operator.

FIGS. 5 and 6 show an analytics engine, such as that of FIG. 4, in more detail. The analytics engine may comprise 3 blocks as shown in FIG. 5:

a) A root cause analysis block 541: root cause analysis is a logic, defined in order to narrow down and isolate the root cause of a network performance issue. Each root cause has a unique solution, or option for change to a network, (or set of solutions) that (after execution of the solution) should address the network performance issue.

b) Pattern recognition block 542: pattern recognition is a logic that is used to identify previously identified (or learned) patterns that helps to avoid potential problems in future, and prevent reoccurrence of problems.

c) Inside builder/thresholds block 543 the content of this functional block is related to predefined thresholds, parameter setting and hardware and/or software configurations in relation to capacity insights.

The flow chart 600 shown in FIG. 6 shows the root cause logic 610 for determining a root cause in the overlaying technologies problem described above. The set of recommendations and scenarios to which the recommender system may be applied are much wider. As can be seen in FIG. 6, to check that the network is operating under normal conditions, e.g. whether a trigger event is occurring, the root cause analysis block 610 may include a step T1 of determining whether a RSS feed flag is active. If so, no action is required.

Otherwise, the root cause logic block determines, in this example, whether technology load is balanced T2, device mix is balanced T3, if there is an incorrect network setting T4 or if the network is causing battery drain T5. The answers to these questions are used to determine a root cause 620 of a change being required. The questions used to determine a root cause of a change to the network being required depending on the network performance issue. At least one option for change, or recommendation, can then be established in dependence on the root cause 620.

It should be understood that each block of the flowchart of FIGS. 3 to 6 and any combination thereof may be implemented by various means or their combinations, such as hardware, software, firmware, one or more processors and/or circuitry. A recommender method such as that of FIGS. 3 to 6 may be implemented in general operations and maintenance (O&M) elements, or on an umbrella platform that covers, i.e. combines, CEM OSS and self-organising network (SON) systems.

Figure 7:
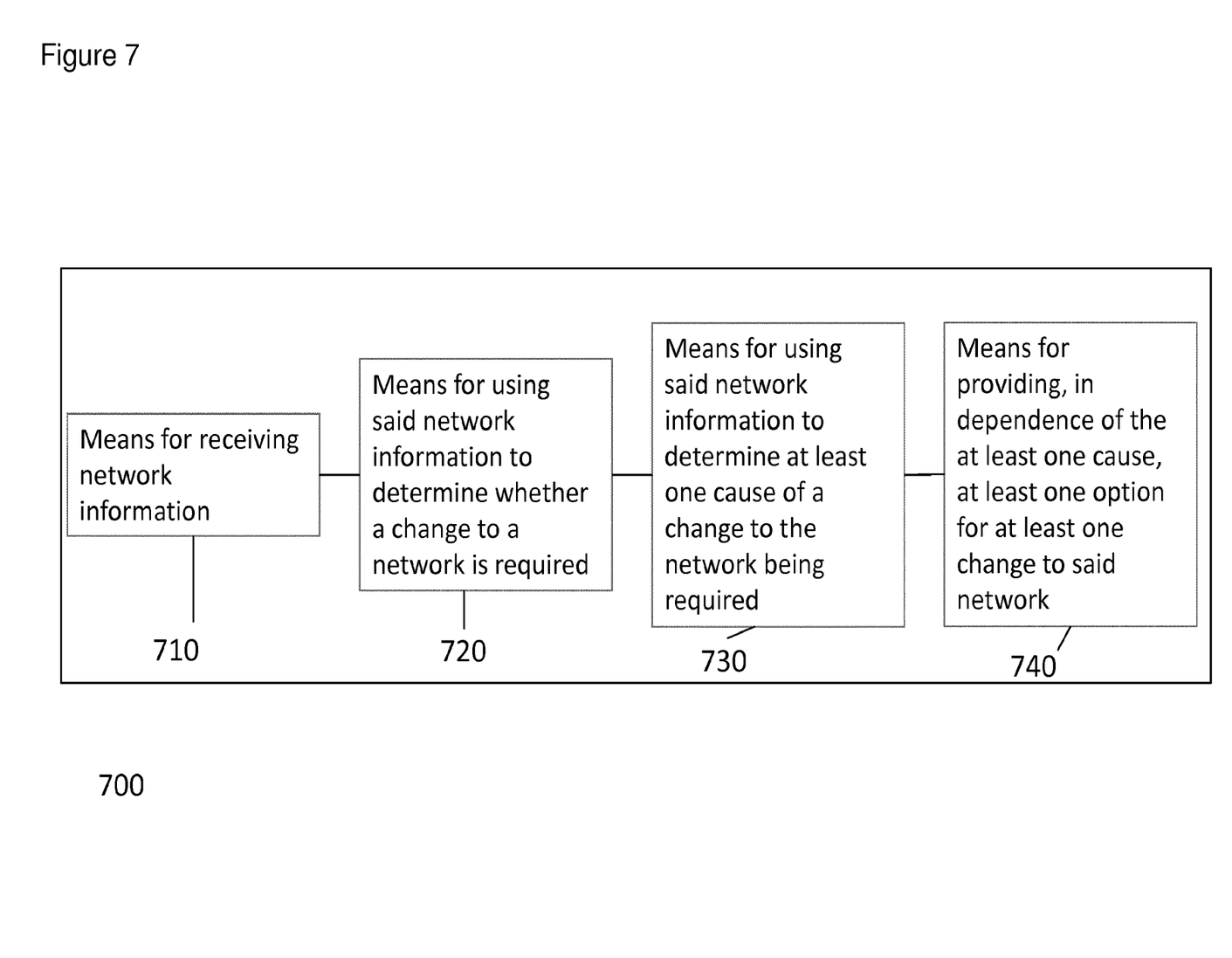
FIG. 7 shows an example apparatus suitable for performing a recommender method.

An example apparatus 700 is shown in FIG. 7. Apparatus 700 comprises means 710 for receiving network information, means 720 for using said network information to determine whether a change to a network is required, and means 730 for, if so, using said network information to determine at least one cause of a change to the network being required and means 740 for providing, in dependence of the at least one cause, at least one option for at least one change to said network.

Figure 8:
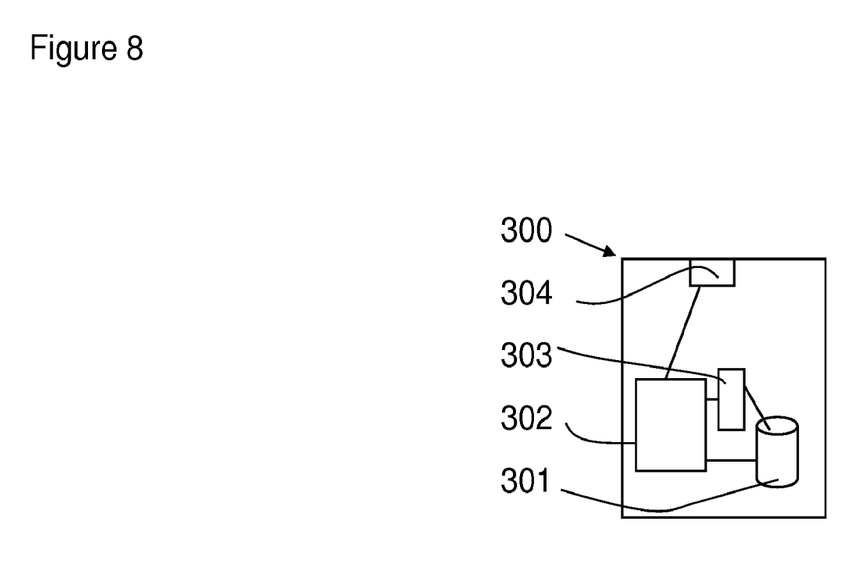
FIG. 8 shows a schematic diagram of an example control apparatus.

Changes to a network may be caused to be implemented on a control apparatus such as that shown in FIG. 8. FIG. 8 shows an example of a control apparatus 300 for a communication system, for example to be coupled to and/or for controlling a network element, for example a station of an access system, such as a base station or (e) node B, or a server or host. The control apparatus 300 may be coupled to and/or control a core node or network element. In other embodiments, the control apparatus 300 can be another network element such as a radio network controller or a spectrum controller. In some embodiments, a base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 can be configured to execute an appropriate software code to provide the control functions. The controller may be used to provide network information to the recommender system performing the methods described above.

It should be understood that the apparatuses may include or be coupled to other units or modules etc., such as radio parts or radio heads, used in or for transmission and/or reception. Although the apparatuses have been described as one entity, different modules and memory may be implemented in one or more physical or logical entities.

It is noted that some whilst embodiments have been described in relation to 2G, 3G and 4G, similar principles can be applied to any other communication network. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), FPGA, gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

We claim:

1. A method, comprising:
receiving network information;
using said network information to determine whether at least one change to a network is required;
using said network information to determine at least one cause of the at least one change;
providing, in dependence of the at least one cause, at least one option for at least one adjustment to said network; and
determining if at least one trigger event is occurring in dependence on said network information, wherein said network information comprises:
network environment information determined using context-based analytics of contextual information external to said network, and
the at least one trigger event is an event outside the scope of network implementation.

2. The method of claim 1, further comprising:
disregarding network information associated with said at least one trigger event when determining whether to change said network.

3. The method of claim 1, further comprising:
causing said at least one adjustment to said network.

4. The method of claim 1, further comprising: determining a potential cost of said at least one adjustment in dependence on said network information.

5. The method of claim 1, further comprising:
determining at least one weighting factor in dependence on said potential cost.

6. The method of claim 1, further comprising:
applying said at least one weighting factor to a plurality of options.

7. The method according to claim 1, wherein said network information comprises at least one of network quality information, network capacity information, network load information, network topology information, and customer usage information.

8. The method according to claim 1, wherein said at least one adjustment comprises at least one hardware adjustment.

9. An apparatus, comprising:
at least one processor; and
at least one memory including computer program code, the at least one memory and the computer program code configured to, with the at least one processor, cause the apparatus at least to:
receive network information;
use said network information to determine whether at least one change to a network is required;
use said network information to determine at least one cause of the at least one change;
provide, in dependence of the at least one cause, at least one option for at least one adjustment to said network; and
determine if at least one trigger event is occurring in dependence on said network information, wherein said network information comprises:
network environment information determined using context-based analytics of contextual information external to said network, and
the at least one trigger event is an event outside the scope of network implementation.

10. The apparatus of claim 9, the at least one memory and the computer program code being further configured to, with the at least one processor, cause the apparatus at least to:
disregard network information associated with said at least one trigger event when determining whether to change said network.

11. The apparatus of claim 9, the at least one memory and the computer program code being further configured to, with the at least one processor, cause the apparatus at least to:
cause said at least one adjustment to said network.

12. The apparatus of claim 9, the at least one memory and the computer program code being further configured to, with the at least one processor, cause the apparatus at least to:
determine a potential cost of said at least one adjustment in dependence on said network information.

13. The apparatus of claim 9, the at least one memory and the computer program code being further configured to, with the at least one processor, cause the apparatus at least to:
determine at least one weighting factor in dependence on said potential cost.

14. The apparatus of claim 9, the at least one memory and the computer program code being further configured to, with the at least one processor, cause the apparatus at least to:
apply said at least one weighting factor to a plurality of options.

15. The apparatus of claim 9, wherein said network information comprises at least one of network quality information, network capacity information, network load information, network topology information, and customer usage information.

16. The apparatus according to claim 9, wherein said at least one adjustment comprises at least one hardware adjustment.

17. A non-transitory computer-readable medium having computer usable instructions stored thereon for execution by a processor, wherein the computer usable instructions cause the processor to:
receive network information;
use said network information to determine whether at least one change to a network is required;
use said network information to determine at least one cause of the at least one change;
provide, in dependence of the at least one cause, at least one option for at least one adjustment to said network; and
determine if at least one trigger event is occurring in dependence on said network information, wherein said network information comprises:
network environment information determined using context-based analytics of contextual information external to said network, and
the at least one trigger event is an event outside the scope of network implementation.

18. The non-transitory computer-readable medium of claim 17, wherein the computer usable instructions further cause the processor to:
disregard network information associated with said at least one trigger event when determining whether to change said network.

19. The non-transitory computer-readable medium of claim 17, wherein the computer usable instructions further cause the processor to:
cause said at least one adjustment to said network.

20. The non-transitory computer-readable medium of claim 17, wherein the computer usable instructions further cause the processor to:
determine a potential cost of said at least one adjustment in dependence on said network information.

* * * * *